US012485682B2

(12) United States Patent
Chong et al.

(10) Patent No.: US 12,485,682 B2
(45) Date of Patent: Dec. 2, 2025

(54) SENSOR LOGIC STATE DETECTIONS

(71) Applicant: Hewlett-Packard Development Company, L.P., Spring, TX (US)

(72) Inventors: Ban Ho Chong, Singapore (SG); Tong Nam Samuel Low, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 614 days.

(21) Appl. No.: 17/724,851

(22) Filed: Apr. 20, 2022

(65) Prior Publication Data

US 2023/0339241 A1 Oct. 26, 2023

(51) Int. Cl.

*B65H 7/04* (2006.01)
*B41J 11/00* (2006.01)
*G03G 15/00* (2006.01)

(52) U.S. Cl.

CPC ............ *B41J 11/0075* (2013.01); *B65H 7/04* (2013.01); *G03G 15/553* (2013.01)

(58) Field of Classification Search

CPC ....... B41J 11/0075; B65H 7/04; G03G 15/553
See application file for complete search history.

(56) References Cited

U.S. PATENT DOCUMENTS

| | | | | |
|---|---|---|---|---|
| 4,733,310 | A | 3/1988 | Kapp et al. | |
| 9,370,944 | B2 | 6/2016 | Barnes et al. | |
| 9,509,877 | B1 | 11/2016 | Barnes et al. | |
| 10,421,299 | B2 | 9/2019 | Daikoku et al. | |
| 10,597,247 | B2 | 3/2020 | Eiyama | |
| 2015/0115522 | A1 * | 4/2015 | Kosaka .................... | B65H 7/04 271/153 |
| 2020/0001627 | A1 | 1/2020 | Suzuki | |
| 2020/0017322 | A1 * | 1/2020 | Adachi .................... | B65H 3/06 |
| 2020/0207570 | A1 | 7/2020 | Arima et al. | |

* cited by examiner

*Primary Examiner* — Thomas A Morrison
(74) *Attorney, Agent, or Firm* — Brooks, Cameron & Huebsch, PLLC

(57) ABSTRACT

Examples described herein relate to system and methods consistent with the disclosure. For instance, the imaging system comprises a tray to receive print media, a first sensor to detect a first printing event in the imaging system, a second sensor to detect a second printing event in the imaging system, and a processing resource to determine if the first sensor detected a first printing event, based on the first sensor detecting print media reaching or dropping below a threshold level in the tray, set a logic state based on determining if the first sensor detected the first printing event, maintain the set logic state responsive to the determination that the first sensor detected the first printing event until the second printing event is detected by the second sensor.

6 Claims, 5 Drawing Sheets

SENSOR LOGIC STATE DETECTIONS

BACKGROUND

Imaging systems, such as printers, may allow text, images, and/or graphics, etc. to be printed onto print media (e.g., paper, plastic, etc.). Imaging systems may perform print jobs to print text, images, and/or graphics, etc. on print media. The imaging system may determine the amount of print media in the imaging system before the print job is performed. Imaging systems may send notifications to a user through an electronic device connected to the imaging system.

DETAILED DESCRIPTION

Systems described herein can be used to detect the level of print media in an imaging system and produce physical representation(s) of text, images, and/or models. Imaging systems can include sensors to determine the amount of print media in the imaging system before or after a physical representation is produced. The imaging system may notify the user of the amount of print media in the imaging system after a sensor determines the amount of print media in the imaging system. That is, a sensor in the imaging system can analyze received signals to determine the amount of print media in the imaging system.

However, some imaging systems, as sensors age, can provide the user with an inaccurate depiction of the amount of print media in the imaging system due to the sensor degrading over time. In addition, some imaging systems can have sensors that analyze the same signal differently under different external noises when determining the amount of print media in the imaging system. Imaging systems that analyze the same signal differently can provide a user with an inaccurate account of print media in the imaging system.

As such, imaging systems, as described herein, include sensors that limit and/or prevent an inaccurate account of print media in the tray of the imaging system. For example, a processing resource can lock the sensor in a particular state to prevent and/or limit the sensor from providing inaccurate information due to detected fluctuations in the same signal. For instance, the imaging system determines a logic state of a first sensor based on the level of print media in the tray and notify an electronic device of the determined logic state. When a first printing event is detected, the imaging system locks the first sensor in the current logic state until a second printing event related to the first printing event is detected. That is, the lock on the first sensor will be removed when a second printing event is detected by a second sensor.

Notably, such imaging systems increase the life of the sensor that determines the level of print media in the imaging system and therefore increase the life of the imaging system, as compared to imaging systems that do not lock the first sensor after a first printing event. In addition, such imaging systems can be produced at a reduced cost, as compared to imaging systems that include added hardware to prevent inaccurate information.

Figure 1:
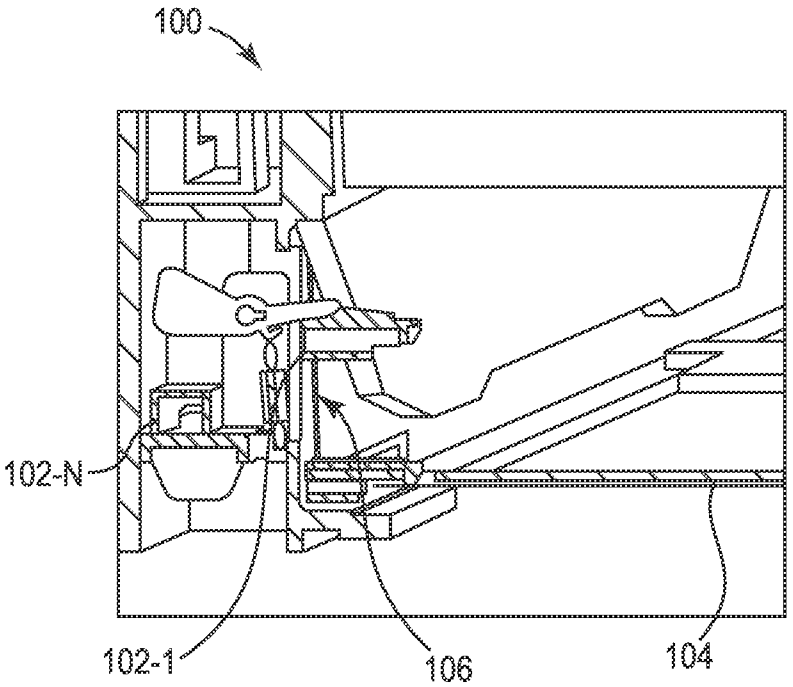
FIG. 1 illustrates an example of an imaging system.

FIG. 1 illustrates an example of an imaging system 100. Imaging system 100 can be implemented in a variety of imaging devices, such as printers, copiers, etc., for example. As used herein, "imaging system" refers to a device with functionalities to physically produce representation(s) of text, images, models, etc. on a print media. Examples of an imaging system include ink/toner printers, laser printers, among other types of imaging systems.

The imaging system 100 includes a tray 104 to receive print media. In some examples, the tray 104 is used to receive and/or hold print media for use during a print job. As used herein, "print job" refers to signals or states, which may be stored in a file and/or a set of files, usable to instruct an imaging system in forming text, images, and/or objects on print media. As print media exits the tray 104 of the imaging system 100 to perform a print job, the level of print media in the tray 104 decreases. In some examples, the imaging system 100 includes a plurality of sensors 102 to detect print media in the imaging system 100, the tray 104 of the imaging system 100, activation of the imaging system 100 and components in the imaging system 100, etc. The sensors 102 in the imaging system 100 can be referred to collectively as sensors 102. As used herein, "sensor" refers to a device with functionalities to detect, measure, record, and/or indicate physically properties and respond to and/or alert other devices/components to the detected, measured, recorded, and/or indicated physically properties.

In some examples, a processing resource of the imaging system 100 causes a first sensor 102-1 to lock in a particular state depending on the nature of the first sensor 102-1. For example, if the processing resource determines the nature of the first sensor 102-1 is print media detection, the processing resource will classify the first sensor 102-1 as a print media sensor. If the first sensor 102-1 is a print media sensor, as determined by the processing resource, the processing resource will cause the print media sensor (e.g., first sensor 102-1) to lock or unlock when particular printing events occur in the imaging system 100. That is, the processing resource will determine the nature of the first sensor 102-1 in the imaging system 100 and cause the first sensor 102-1 to lock or unlock depending on the type of printing event detected and the nature of the first sensor 102-1. As used herein, a "printing event" refers to an action taken by the imaging system and/or components of the imaging system.

In some examples, a first sensor 102-1 is a print media sensor to determine the level and/or type/size of print media in the tray 104. Based on the level and/or type/size of print media in the tray 104, the first sensor 102-1 causes the imaging system 100 to notify a user, via an electronic device, of the level and/or type/size of print media in the tray 104 before, after, and/or during a print job. As used herein, "print media sensor" refers to a device with functionalities to detect, measure, record, and/or indicate the level of print media in the tray and/or the type/size of print media in the tray and respond to and/or alert other devices/components to the detected, measured, recorded, and/or indicated level, type, and/or size of print media in the tray. For example, the print media sensor can be a low-on-print media sensor to indicate when print media has reached/dropped below a defined level in the tray 104, an out-of-print media sensor to indicate when the tray is out of print media (or dropped below a define level), and/or a media size sensor to indicate the type and/or size of print media in the tray 104.

For example, the first sensor 102-1 causes the imaging system 100 to send a message to a user, via an electronic device, when the print media in the tray 104 has reached or dropped below a threshold level 106. That is, the first sensor 102-1 detects when print media in the tray 104 has dropped to/dropped below a set level (e.g., threshold level 106). In addition, the first sensor 102-1 causes the imaging system 100 to send a message to a user, via an electronic device, based on the type and/or size of print media in the tray 104. As used herein, "level" refers to the position or height of an object (e.g., print media). As used herein, the term "above a threshold level" can, for example, refer to a value crossing a first side of a bound. As used herein, the term "below a threshold level" can, for example, refer to a value crossing a second side of a bound. As used herein, the term "at a threshold level" or "reaches a threshold level" can, for example, refer to a value being at a bound.

In some examples, the first sensor 102-1 can have a logic state of 0 (e.g., first logic state) when print media is above a threshold level 106. In contrast, the first sensor 102-1 can have a logic state of 1 (e.g., second logic state) when print media has reached or dropped below a threshold level 106. In some examples, the first sensor 102-1 analyzes changes in signals to determine when to transition logic states. That is, the signal that is received, by the first sensor 102-1, when print media in the tray is above the threshold level is different than the signal received, by the first sensor 102-1, when print media is at or below the threshold level. The first sensor 102-1 is able to analyze the received signal to determine if it has changed to determine the logic state.

In some examples, the first sensor 102-1 can have a logic state of 0 (e.g., first logic state) when print media in the tray 104 is the correct size and/or type and have a logic state of 1 (e.g., second logic state) when print media in the tray 104 is not the correct size and/or type. For example, the imaging system 100 can have a default size and/or type of print media to use during a print job. However, this disclosure is not so limited. For example, a user can set a size and/or type of print media for the imaging system 100 to use during a print job. If the print media in the tray is not the default/set size and/or type, the print media in the tray 104 is not the correct size and/or type for the imaging system 100. In some examples, the first sensor 102-1 is able to analyze received signals to determine the size and/or type of print media in the tray 104 to determine the logic state. That is, first sensor 102-1 can receive a different signal for each size and/or type of print media in the tray 104.

In some examples, when the first sensor 102-1 detects a change in the received signal the first sensor 102-1 transitions between logic states. That is, the first sensor 102-1 transitions between a first logic state and a second logic state depending on the level, size, and/or type of print media in the tray 104. In some examples, the first sensor 102-1 causes the imaging system 100 to send a message to a user, via an electronic device, when the first sensor 102-1 transitions to a logic state of 1 (e.g., detects print media in the tray has reached or dropped below the threshold level, detects the incorrect type and/or size of print media in the tray). Similarly, the first sensor 102-1 causes the imaging system 100 to send a message to a user via an electronic device when the first sensor 102-1 transitions to a logic state of 0 (e.g., detects print media in the tray is above the threshold level, detects the correct type and/or size of print media in the tray). It should be understood that a first logic state can be either a logic state of 0 or a logic state of 1 and has a different logic state than the second logic state. In addition, it should be understood that a second logic state can be either a logic state of 0 or a logic state of 1 and has a different logic state than the first logic state.

In some examples, print media reaching or dropping below a threshold level 106 is a first printing event. In some examples, the first sensor 102-1 detecting the incorrect type and/or size of print media in the tray 104 is a first printing event. For instance, if the incorrect type and/or size of print media is in the tray 104, the print media may not be able to properly flow through the print media pathway. As used herein, a "first printing event" refers to a printing event that limits and/or blocks the flow of print media in the tray or print media pathway and/or prevents the print media in the tray from being above a threshold level. When a first printing event is detected, the first sensor 102-1 will be prevented from transitioning between logic states. That is, a processing resource will lock the first sensor 102-1 in the logic state detected immediately after the first printing event is detected. For example, when the first sensor 102-1 transitions to a logic state of 1, the first sensor 102-1 will maintain the logic state of 1 until a second printing event occurs.

For instance, the first sensor 102-1 will remain in the current logic state (e.g., logic state of 1), even if the first sensor 102-1 detects print media in the tray 104 above a threshold level 106 or detects the correct print media in the tray 104, until a second printing event is detected by the imaging system 100. In some examples, a second printing event can be detected by a second sensor 102-N. The second printing event can be a reset event. For instance, the second printing event causes the first sensor 102-1 to reset, allowing the first sensor 102-1 to transition between logic states. In some examples, a second senor 102-N can be a tray sensor to detect when a tray 104 is present in the imaging system 100. As used herein, "tray sensor" refers to a device with functionalities to detect, record, and/or indicate if the tray is present in, has been removed from, and/or has been reinserted (e.g., replaced) in the imaging system and respond to and/or alert other devices/components to the detected, recorded, and/or indicated tray and its previous and/or current location. If the second sensor 102-N (e.g., tray sensor) detects that the tray 104 has been removed from the imaging system 100 and replaced, a second printing event will be detected and the first sensor 102-1 will reset. The first sensor 102-1 will be allowed to transition between a first logic state and a second logic state upon resetting. Said differently, the first sensor 102-1 will be able to transition between a logic state of 1 and a logic state of 0. As used herein, a "second printing event" refers to a printing event that could lead to increasing and/or unblocking the flow of print media in the tray/print media pathway and/or a printing event that could cause the print media in the tray to be above a threshold level.

In some examples, the first sensor 102-1 will determine the level of print media in the tray 104 after a second printing event has occurred. That is, once the first sensor 102-1 is reset, allowing the first sensor 102-1 to transition between a first logic state and a second logic state, the first sensor 102-1 will determine the level of print media in the tray 104 and set a logic state based on the determination. For example, if the first sensor 102-1 was locked in a logic state of 1, after a second printing event resetting the first sensor 102-1, the first sensor 120-1 will detect the level of print media in the tray 104 to determine if the first sensor 102-1 should transition to a logic state of 0 or stay at a logic state of 1. If the level of print media in the tray 104 is above a threshold level 106, the first sensor 102-1 will transition to a logic state of 0. In contrast, if the level of print media in the tray 104 is at or drops below the threshold level 106, the first sensor 102-1 will remain at a logic state of 1 and maintain the logic state of 1 until another second printing event is detected by the second sensor 102-N. Similarly, in some examples, the first sensor 102-1 can determine the type and/or size of print media in the tray 104 after a second printing event has occurred and set the logic state of the first sensor 102-1 based on the determination.

In some examples, a second printing event can occur when a tray 104 is removed and replaced, as print media could have been changed and/or added to the tray 104 before replacement. In addition, a second printing event can occur when the imaging system 100 is turned off and turned back on, as print media could have been changed and/or added to the tray 104 before the imaging system 100 was turned back on. Changing the type and/or size of print media can increase the flow of print media in the print media pathway. Moreover, a second printing event can occur when print media blocking the print media pathway is removed, since print media can now flow through the imaging system 100 after the removal of the print media. Furthermore, a second printing event can occur when the imaging system 100 is restarted, as print media could have been changed and/or added to the tray 104 while the imaging system 100 is restarting.

The first sensor 102-1 will maintain a logic state when a first printing event is detected. The first sensor 102-1 will maintain the logic state until a second printing event occurs. The second printing event can be detected by a second sensor 102-N. Once the second printing event is detected the first sensor 102-1 will be allowed to transition between logic states (e.g., first logic state and a second logic state).

In some examples, the first sensor 102-1 can detect a first printing event in the imaging system 100. Similarly, a second sensor 102-N can detect a second printing event in the imaging system 100. In some examples, a processing resource can determine if the first sensor 102-1 detected the first printing event based on the first sensor 102-1 detecting print media reaching or dropping below a threshold level 106 in the tray 104. In addition, the processing resource can cause the first sensor 102-1 to set a logic state based on the determination that the first sensor 102-1 detected the first printing event. That is, the processing resource can cause the first sensor 102-1 to set a first logic state responsive to a determination that the print media is above the threshold level 106. In contrast, the processing resource can cause the first sensor 102-1 to maintain a second logic state responsive to a determination that the print media has reached or dropped below the threshold level 106.

The first sensor 102-1 will maintain the set logic state responsive to the determination that the first sensor 102-1 detected the first printing event until the second printing event is detected by the second sensor 102-N. In some examples, the second printing event occurs subsequent to the first printing event and is related to the first printing event. In some examples, the second sensor 102-N can be a tray sensor that detects the second printing event responsive to a removal and replacement of the tray 104 from the imaging system 100. In various examples, the second sensor 102-N can be a power sensor that detects the second printing event responsive to an activation of the imaging system 100 from a deactivated state. As used herein, "power sensor" refers to a device with functionalities to detect, record, and/or indicate the activation, deactivation, and/or restarting of the imaging system and respond to and/or alert other devices/components to the detected, recorded, and/or indicated activation, deactivation, and/or restarting of the imaging system.

In some examples, maintaining the logic state of a first sensor 102-1 when a first printing event occurs, prevents the first sensor 102-1 from providing a user, via an electronic device, inaccurate determination (e.g., false readings) of the level, size, and/or type of print media in the tray 104. For instance, the same signal can be analyzed differently due to different external conditions which could lead to an inaccurate determination in the level, size, and/or type of print media in the tray 104. As such, the first sensor 102-1 will lock to prevent an unwarranted transition in logic states and providing a user with an updated notification related to the level, size, and/or type of print media in the imaging system 100. In some examples, preventing a first sensor 102-1 from giving false readings can extend the life of the sensors 102 in the imaging system 100, which results in an imaging system 100 having a longer useful life, as compared to imaging systems that do not prevent false readings as described herein.

Figure 2:
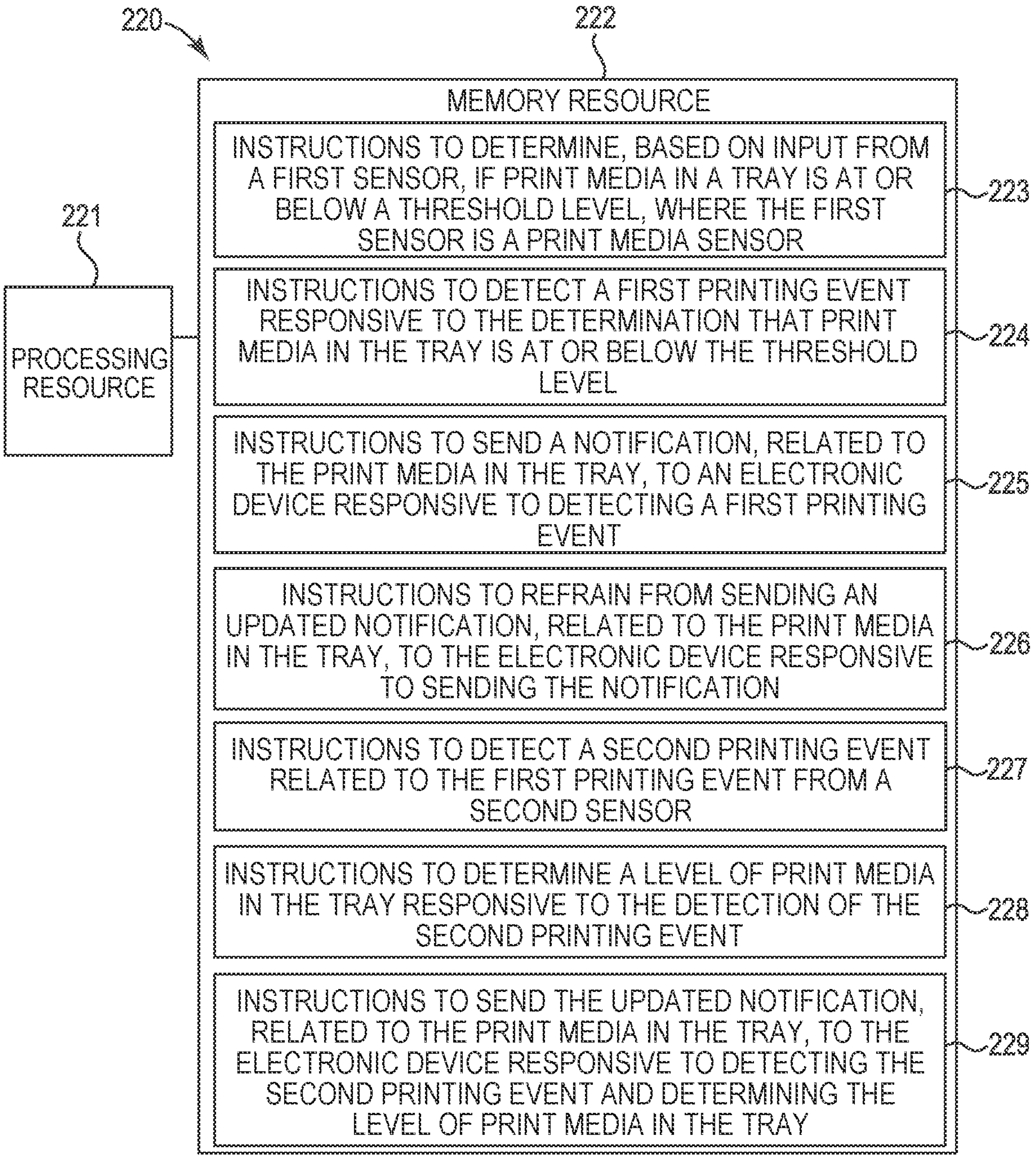
FIG. 2 illustrates an example processing resource and memory resource suitable with an imaging system.

FIG. 2 illustrates an example processing resource 221 and memory resource 222 suitable with an imaging system. As illustrated in FIG. 2, the apparatus 220 includes a processing resource 221 and a memory resource 222. The processing resource 221 may be a hardware processing unit such as a microprocessor, application specific instruction set processor, coprocessor, network processor, application specific integrated circuit (ASIC), general purpose input output (GPIO), or similar hardware circuitry that may cause machine-readable instructions to be executed. In some examples, the processing resource 221 may be a plurality of hardware processing units that may cause machine-readable instructions to be executed. The processing resource 221 may include central processing units (CPUs) among other types of processing units. The memory resource 222 may be any type of volatile or non-volatile memory or storage, such as random-access memory (RAM), flash memory, read-only memory (ROM), storage volumes, a hard disk, or a combination thereof.

The memory resource 222 may store instructions thereon, such as instructions 223, 224, 225, 226, 227, 228, and 229. When executed by the processing resource 221, the instructions may cause the apparatus 220 to perform specific tasks and/or functions. For example, the memory resource 222 may store instructions 223 which may be executed by the processing resource 221 to cause the apparatus 220 to determine, based on input from a first sensor, if print media in a tray is at or below a threshold level, where the first sensor is a print media sensor. In some examples, the imaging system includes a first sensor to determine when the tray is low on print media, when the tray is out of print media, and/or the type and size of print media in the tray. The first sensor (e.g., print media sensor) can determine the level of print media in the tray by detecting if the print media in the tray falls below or reaches a threshold level. In some examples, a first sensor analyzes signals received from a component of the imaging system to determine if the print media in the tray is above or at/below a threshold. The first sensor will transition between logic states based on the signal received by the first sensor. That is, the first sensor can receive different signals to identify the level of the print media in the tray. For example, the first sensor can transition between a first logic state and a second logic state as print media is added and removed from the tray and signals based on the level of print media are received. When print media is above a threshold, the first sensor can have a logic state of 0 (e.g., a first logic state). Conversely, when the print media is at or below a threshold, the first sensor can have a logic state of 1 (e.g., a second logic state). In some examples, the imaging system alerts the user when the first sensor transitions between logic states.

The memory resource 222 may store instructions 224 which may be executed by the processing resource 221 to cause the apparatus 220 to detect a first printing event responsive to the determination that print media in the tray is at or below the threshold level. In some examples, the first sensor (e.g., a print media sensor) determines when print media in the tray has reached or dropped below a threshold level. When print media has reached a threshold level it is not possible for print media to rise above the threshold level unless print media is added to the tray of the imaging system. In some examples, the first sensor will identify the print media reaching or dropping below the threshold level as a first printing event, since is not possible for print media to rise above the threshold level unless print media is added to the tray. Said differently, the first sensor will identify the transition from a logic state of 0 to a logic state of 1 as a first printing event. Print media can be added to the tray at different times. For example, print media can be added to the tray when the tray is removed, when the imaging system is powered off, and/or when the imaging system is restarted, amongst other times. However, since print media in the tray cannot increase until print media is added to the tray, the first sensor detecting print media below or at a threshold level is a first printing event. That is, print media may be added to the tray of the imaging system during a reset event.

The memory resource 222 may store instructions 225 which may be executed by the processing resource 221 to cause the apparatus 220 to send a notification, related to the print media in the tray, to an electronic device responsive to detecting a first printing event. In some examples, the first sensor will alert a user when the print media reaches or drops below a threshold level to inform the user that print media will soon need to be replaced in the tray. Said differently, the imaging system will notify a user, via an electronic device, that the first sensor has transitioned into a logic state of 1. In some examples, the first sensor can detect the level of print media in the tray at various times to determine the level of print media in the tray. For example, the first sensor can detect the level of print media in the tray before a print job, after a print job, during a print job, etc. The imaging system can use the information detected by the first sensor to alert the user to the level of print media in the tray. For example, the imaging system can alert the user that the tray is full and/or above a threshold level. Conversely, imaging system can alert the user that the tray is empty and/or below a threshold level.

The memory resource 222 may store instructions 226 which may be executed by the processing resource 221 to cause the apparatus 220 to refrain from sending an updated notification, related to the print media in the tray, to the electronic device responsive to sending the notification. In some examples, the processing resource 221 will lock the first sensor prior to refraining from sending the updated notification to the electronic device. As described herein, it is not possible for print media to rise above the threshold level, unless print media is added to the tray once print media has reached a threshold level. However, due to external factors it is possible for a sensor to analyze the same signal differently, which could lead to an inaccurate description of the level of print media in the tray. As such, the processing resource will cause the imaging system to notify the user that the print media in the tray has reached or dropped below a threshold level and cause the first sensor to lock at a logic state of 1 when the first sensor transitions to the logic state of 1. For instance, if the first sensor has detected that the print media in the tray has reached or dropped below a threshold level and later detects the print media above a threshold level, the processing resource will prevent the imaging system from alerting the user that the print media in the tray is above a threshold level, until a reset of the first sensor occurs (e.g., a second printing event is detected), That is, locking the first sensor will prevent the imaging system from notifying the user of an updated determination, made by the first sensor, that is not possible. However, the imaging system may resend a notification that the print media in the tray has reached or dropped below a threshold level. In addition, the imaging system may send a notification informing the user that the tray is empty (e.g., not print media is in the tray), Refraining from sending an update notification related to the level of print media in the tray may prevent the first sensor from sending erroneous readings of the level of print media in the tray.

The memory resource 222 may store instructions 227 which may be executed by the processing resource 221 to cause the apparatus 220 to detect a second printing event related to the first printing event from a second sensor. In some examples, a second sensor can detect events that causes a processing resource to reset and unlock the first sensor. In some examples, the first sensor will reset and unlock when a second sensor detects an event; related to the first printing event; that can lead to a change in the level of print media in a tray. For example, a tray sensor can detect when a tray is removed from the imaging system. When a tray is removed from the imaging system print media can be added to or removed from the tray before the tray is returned to the imaging system. Therefore; if the first printing event is the first sensor detecting print media reaching or dropping below a threshold level, a tray sensor detecting the tray being removed and replaced from the imaging system can be a second printing event that resets and unlocks the first sensor. In addition, a power sensor can detect when the imaging system is activated from a deactivated state or when the imaging system has been restarted. While the imaging system is deactivated or being restarted the tray could be removed and replaced. As such, if the first printing event is the first sensor detecting print media reaching or dropping below a threshold level, a power sensor detecting the activation or restarting of the imaging system can be a second printing event that resets and unlocks the first sensor.

The memory resource 222 may store instructions 228 which may be executed by the processing resource 221 to cause the apparatus 220 to determine a level of print media in the tray responsive to the detection of the second printing event. In some examples, prior to determining the level of print media in the tray and subsequent to detecting the second printing event, the processing resource 221 will unlock the first sensor. In some examples, after the first sensor is unlocked, the first sensor will make a new determination of the level of print media in the tray. Since the first sensor is unlocked and has been reset, the first sensor can make a new determination of the logic state. As such, the first sensor can transition between a first logic state and a second logic state based on the amount of print media added or removed from the tray. That is, the first sensor will determine if the print media in the tray has reached or dropped below the threshold level and transition between the first logic state and the second logic state based on the determination.

The memory resource 222 may store instructions 229 which may be executed by the processing resource 221 to cause the apparatus 220 to send the updated notification, related to the print media in the tray, to the electronic device responsive to detecting the second printing event and determining the level of print media in the tray. In some examples, after the first sensor is unlocked and a new determination of the level of print media in the tray is made, the imaging system sends an updated notification alerting the user of the level of print media in the tray. The updated notification is based on the new determination of the level of print media in the tray that occurred subsequent to the second printing event. If the first sensor determines that the print media is above a threshold level, the first sensor will remain unlocked, and the user will be notified that the print media is above a threshold level. If the first sensor determines that the print media has reached or dropped below a threshold level, the first sensor will lock until a new second printing event is detected by a second sensor and the user will be notified that the print media in the tray is at or below a threshold level.

Figure 3:
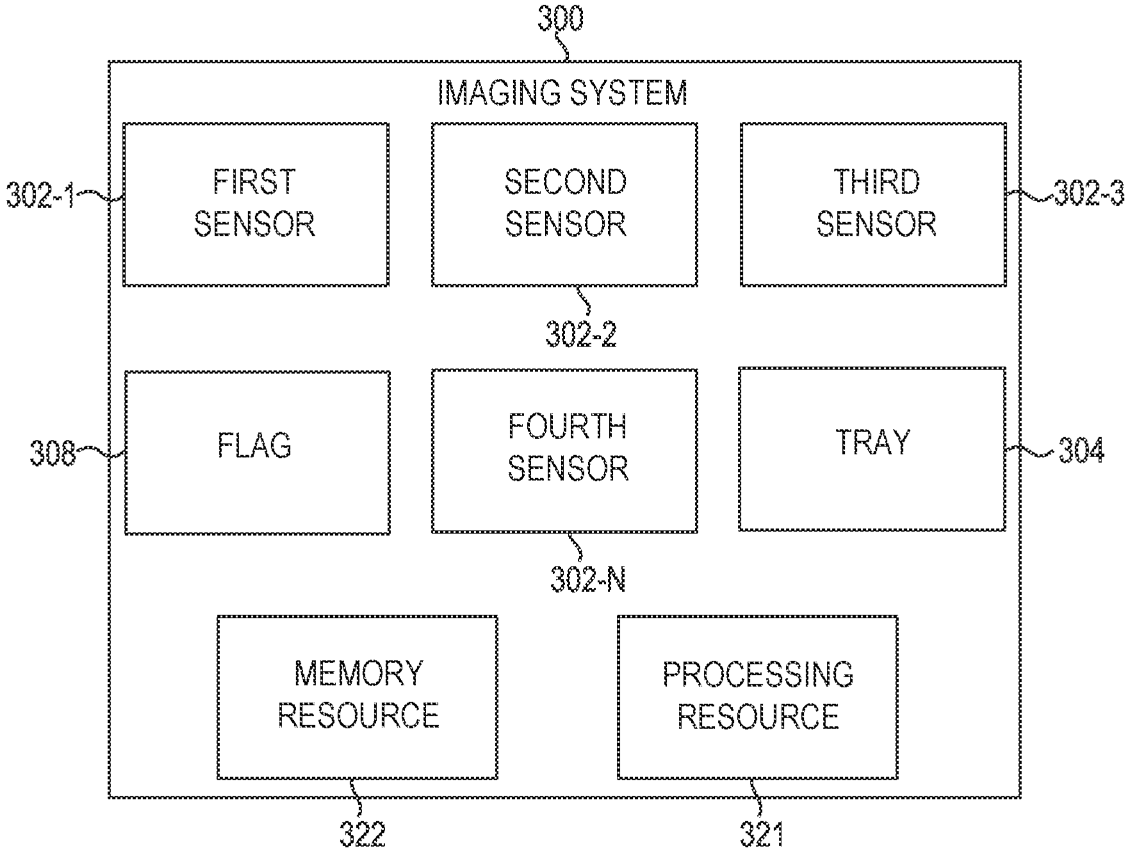
FIG. 3 illustrates an example of an imaging system.

FIG. 3 illustrates an example of an imaging system 300. FIG. 3 can include analogous or similar elements as FIG. 1. For example, FIG. 3 can include an imaging system 300, a tray 304, a first sensor 302-1, and a second sensor 302-2. The imaging system 300 includes a plurality of sensors 302 (first sensor 302-1, second sensor 302-2, third sensor 302-3, and fourth sensor 302-N can be referred collectively as sensors 302) to detect printing events before, during, and after a print job. The imaging system 300 can use different sensors 302 to detect different printing events.

For example, a first sensor 302-1 can be a print media sensor. The print media sensor can be used to determine the level of print media in a tray 304 relative to a threshold level. The second sensor 302-2 can be a tray sensor. The tray sensor can be used to determine when the tray 304 is removed and replaced from the imaging system 300. The third sensor 302-3 can be a pathway sensor. As used herein, "pathway sensor" refers to a device with functionalities to detect, record, and/or indicate the presence of print media remaining in the print media pathway and respond to and/or alert other devices/components to the detected, recorded, and/or indicated print media remaining in the print media pathway. The pathway sensor can be used to detect when print media is in jammed (e.g., stuck) in the print media pathway. The fourth sensor 302-N can be a power sensor. The power sensor can be used to determine when the imaging system 300 is activated, deactivated, and/or restarted. It should be understood that the second sensor, third sensor, or fourth sensor can be either a tray sensor, pathway sensor, or a power sensor.

In some examples, the processing resource 321 can use instructions stored in the memory resource 322 to lock the first sensor 302-1 (e.g., print media sensor) when a first printing event is detected. In some examples, the first sensor 302-1 and/or the third sensor 302-3 can detect a first printing event. For example, a first sensor 302-1 (e.g., print media sensor) detects when print media reaches or drops below a threshold level. The print media in the tray 304 reaching or dropping below a threshold level is a printing event that prevents the increase of print media in the tray. Said differently, reaching or dropping below a threshold level is a printing event that prevents print media in the tray 304 from being above a threshold level. As such, the processing resource 321 will cause the first sensor 302-1 to lock in the current logic state when it is determined that the print media in the tray 304 has reached or dropped below the threshold level. Similarly, a third sensor 302-3 (e.g., pathway sensor) detects when print media is stuck and/or jammed in the print media pathway. Print media being stuck or jammed in the print media pathway is a printing event that prevents print media from exiting the imaging system 300. Therefore, a print media jam is a first printing event. The processing resource 321 will cause the first sensor 302-1 to lock in the current logic state when it is determined that print media is stuck or jammed in the print media pathway. In some examples, the imaging system 300 will notify the user of the print media jam and notify the user of the level of print media in the tray 304 when a print media jam is detected by the pathway sensor (e.g., third sensor 302-3). As used herein, a "print media jam" refers to the act of print media blocking the print media pathway. For example, a print media jam occurs when print media is lodged, stuck, and/or jammed in the print media pathway.

In some examples, the first sensor 302-1 will cause a notification to be sent to the user regarding the level of print media is in the tray 304. That is, based on the determination made by the first sensor 302-1, the imaging system 300 will alert the user that the print media in the tray 304 is above a threshold level or the imaging system 300 will alert the user that the print media in the tray 304 is at or below a threshold level. In some examples, the first sensor 302-1 will lock substantially simultaneously when the low on print media out of print media message is sent to the user. However, this disclosure is not so limited. In some examples, the first sensor 302-1 will lock immediately before or immediately after the low on print media/out of print media message is sent. That is, the first sensor 302-1 can lock once the first sensor 302-1 detects the print media in the tray at or below the threshold level. As used herein, the term substantially intends that the characteristic does not have to be absolute but is close enough so as to achieve the characteristic. For example, "substantially simultaneous" is not limited to absolute simultaneous. For example, "substantially same" is not limited to absolutely the same.

In some examples, the imaging system 300 can include a flag 308 to manually lock the first sensor 302-1 in place. The flag 308 manually locking the first sensor 302-1 in place can prevents the first sensor 302-1 from transitioning between different logic states.

In some examples, the first sensor 302-1 will not be able to cause an updated notification to be sent to the user when locked. For example, if the first sensor 302-1, subsequent to locking, detects the print media in the tray 304 is above a threshold level, the imaging system 300 will not send an updated message related to the level of print media in the tray 304. The imaging system 300 may resend the previous notification informing the user that the imaging system 300 is low on print media/out of print media (e.g., print media has reached or dropped below a threshold level). In some examples, the imaging system 300 will not send an updated message related to the level of print media in the tray 304 until the first sensor 302-1 is unlocked (e.g., a second printing event has been detected in the imaging system).

In some examples, the first sensor 302-1 will unlock when a second printing event is detected by second sensor 302-2, third sensor 302-3, and/or a fourth sensor 302-N. The second printing event is an event that resets and unlocks the first sensor 302-1; allowing the first sensor 302-1 to transition between logic states. In addition, the second printing event allows the imaging system 300 to send notifications to the user, via an electronic device, relating to the level of print media in the tray 304. The second printing event will cause the first sensor 302-1 to unlock when the second printing event is related to the first printing event that caused the first sensor 302-1 to lock. As described herein, the first sensor 302-1 will unlock when a second sensor 302-2 detects an event, related to the first printing event, that can lead to a change in the level of print media in the tray. For example, a pathway sensor can detect when print media blocking the print media pathway is removed allowing print media to flow from the tray.

In some examples, the first sensor 302-1 will lock when the first sensor 302-1 detects the print media in the tray 304 has reached of dropped below a threshold level. The imaging system 300 will notify the user of the level of print media in the tray 304 and lock the first sensor 302-1. As the imaging system 300 continues to perform print jobs after the first sensor 302-1 locks, a third sensor 302-3 (e.g., pathway sensor) can detect a print media jam. That is, the imaging system 300 can detect 2 (two) different first printing events (e.g., a first printing event and an additional first printing event) that can cause the locking of the first sensor 302-1. In some examples, the first sensor 302-1 will unlock when a second printing event related to the first printing event is detected.

For example, if the second printing event is the removal and replacement of the tray 304, detected by the tray sensor (e.g., second sensor 302-2), the first sensor 302-1 will unlock as to the low on print media/out of print media first printing event. However, the first sensor 302-1 may remain locked as a second printing event (e.g., an additional second printing event) related to the print media jam has not been detected. That is, the first sensor 302-1 will not unlock until a second printing event and an additional second printing event related to the first printing event and the additional first printing event are detected. For instance, the first sensor 302-1 will not unlock until the removal and replacement of the tray 304, detected by the tray sensor (e.g., second sensor 302-2) and the pathway sensor (e.g., third sensor 302-3) detects the print media has been removed from the print media pathway. In some examples, the second printing event and the additional second printing event can be the same event. For example, the first sensor 302-1 can unlock when a power sensor (e.g.; fourth sensor 302-N) detects the activation of the imaging system 300 from a deactivated state. That is, the power sensor detecting the activation of the imaging system 300 is an event related to the first printing event and the additional first printing event. That is, when a imaging system 300 is deactivated it is possible that the tray 304 could have been removed and replaced or the print media blocking the print media pathway was removed. Therefore, in this example, the activation of the imaging system 300 or restarting of the imaging system 300, can be a second printing event and an additional second printing event.

Said differently, the processing resource 321 can store use instructions on a memory resource 322 to detect an additional first printing event from a third sensor 302-3 and lock the first sensor 302-1 in the current logic state subsequent to the detection of the additional first printing event. Moreover, the processing resource 321 can remove the lock, related to the additional first printing event, on the first sensor 302-1 responsive to detecting an additional second printing event related to the additional first printing event, where removing the lock places the first sensor 302-1 in the dynamic state. That is, placing the first sensor 302-1 in a dynamic state allows the first sensor 302-1 to transition between logic states. For instance, the first sensor 302-1 can determine if the first sensor 302-1 is in a first logic state or a second logic state based on the level of print media in the tray 304 responsive to removing the lock, related to the first printing event and the additional first printing event, on the first sensor 302-1. In some examples, the additional second printing event is detected by a third sensor 302-3 (e.g., pathway sensor) or a fourth sensor 302-N (e.g., power sensor). In some examples, the first printing event and the additional first printing event can be detected at a substantially same time.

In some examples, unlocking the first sensor 302-1 allows the first sensor 302-1 to transition between logic states, detect the level of print media in the tray 304, and cause the imaging system 300 to send messages based on the logic state of the first sensor 302-1 and the level of print media in the tray 304. Preventing the imaging system 300 from notifying the user of the level of print media in the tray 304 until the first sensor 302-1 is unlocked, can prevent the first sensor 302-1 from providing the user with inaccurate information and increase the life of the first sensor 302-1 and the imaging system 300, as compared to imaging systems that do not lock the first sensor after a first printing event.

Figure 4:
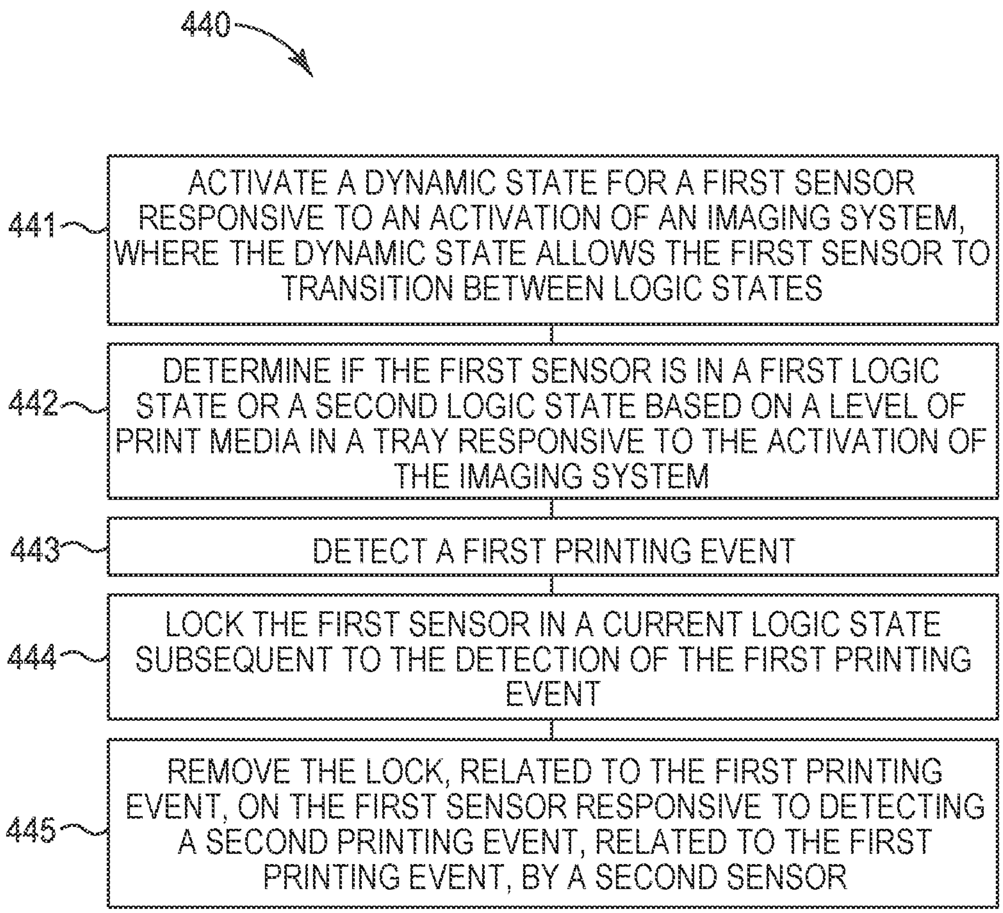
FIG. 4 illustrates an example of a method for an imaging system.

FIG. 4 illustrates an example of a method 440 for an imaging system. Method 440 may be performed, for example, by a controller (e.g., processing resource 321 of FIG. 3). At 441, the method 440 may include activating a dynamic state for a first sensor responsive to an activation of an imaging system, where the dynamic state allows the first sensor to transition between logic states. In some examples, when the imaging system is activated a print media sensor (e.g., first sensor 302-1 of FIG. 3) returns to a state in which the first sensor can transition between different logic states. For example, the first sensor will be able to transition between a first logic state which could indicate that the print media in the tray is above a threshold level and a second logic state which could indicate that the print media in the tray is at or below a threshold level. That is, activating a deactivated imaging system can cause the first sensor to reset and allow the first sensor to transition between logic states.

At 442, the method 440 may include determining if the first sensor is in a first logic state or a second logic state based on a level of print media in a tray responsive to the activation of the imaging system. In some examples, when a first sensor has undergone a reset the first sensor will detect the level of print media in the tray. However, this disclosure is not so limited. For example, the first sensor can detect the level of print media in the tray at various times while the imaging system is activated and the first sensor in unlocked. The first sensor will determine the logic state (e.g., first logic state or second logic state) after detecting the level of print media in the tray.

At 443, the method 440 may include detecting a first printing event. In some examples, the first sensor can detect a first printing event. Detecting a first printing event can cause the first sensor to lock, which can prevent the first sensor from transitioning between logic states. In some examples, if the first sensor is a print media sensor, the first sensor identifies when print media reaches or drops below a threshold level as a first printing event. The first printing event is an event that causes the print media sensor (e.g., first sensor) to lock (e.g., prevent the transition of the logic state of the print media sensor).

However, this disclosure is not so limited. In some examples, a second sensor can detect a first printing event. For example, the pathway sensor (e.g., second sensor) can detect a print media jam during a print job, after a print job, and/or before a print job is received. As described herein, the print media jam detected by the pathway sensor (e.g., second sensor) can cause the print media sensor (e.g., first sensor) to lock. That is, if a print media jam is detected in the imaging system, the print media sensor may remain in the current logic state until the print media jam is removed or an event that could result in the removal of the print media jam (e.g., deactivating and reactivating the imaging system, restarting the imaging system, etc.) occurs.

At 444, the method 440 may include locking the first sensor in a current logic state subsequent to the detection of the first printing event, where the current logic state is the logic state of the first sensor subsequent to the detection of the first printing event. In some examples, a print media sensor (e.g., first sensor) will remain in the current logic state when a first printing event is detected. As such, the first sensor (e.g., print media sensor) will lock when an event that prevents print media from being above a threshold level is detected by a first sensor (e.g., print media sensor) or an event that limits or blocks the print media pathway is detected by the second sensor (e.g., pathway sensor).

At 445, the method 440 may include removing the lock, related to the first printing event, on the first sensor responsive to detecting a second printing event, related to the first printing event, by a second sensor. In some examples, the first sensor will unlock when a second printing event related to the first printing event is detected by a sensor other than the first sensor. The second printing event is an event that causes the first sensor to reset, allowing the first sensor to transition between a first logic state and a second logic state. In some examples, a second printing event is detected when the imaging system is activated, the imaging system is restarted, a print media jam is removed from the print pathway, and/or when the tray is removed from the imaging system, etc. A second sensor can be a power sensor, a tray sensor, or a pathway sensor, etc. For example, when a power sensor detects the activation or restart of the imaging system, the processing resource will cause the first sensor to unlock and determine the level of print media in the tray. Similarly, when the pathway sensor detects print media removed from the print media pathway or the tray sensor detects the tray being removed and replaced from the imaging system, the processing resource will cause the first sensor to unlock and determine the level of print media in the tray. In some examples, the first sensor determines if the first sensor is in the first logic state, or the second logic state, based on the level of print media in the tray responsive to removal of the lock on the first sensor.

Figure 5:
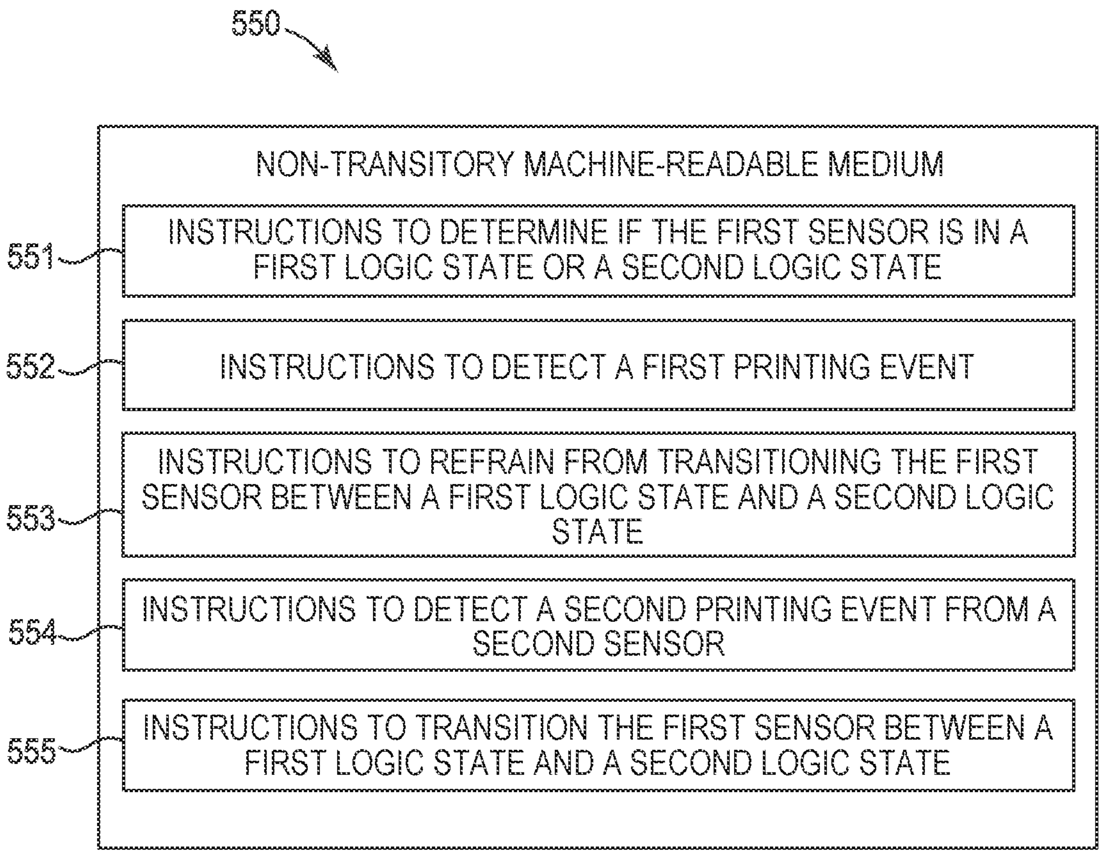
FIG. 5 illustrates an example diagram of a non-transitory machine-readable medium suitable with an imaging system.

FIG. 5 illustrates an example diagram of a non-transitory machine-readable medium 550 suitable with an imaging system. A processing resource may execute instructions stored on the non-transitory machine-readable medium 550. The non-transitory machine-readable medium 550 may be any type of volatile or non-volatile memory or storage, such as random-access memory (RAM), flash memory, read-only memory (ROM), storage volumes, a hard disk, or a combination thereof.

The non-transitory machine-readable medium 550 stores instructions 551 executable by a processing resource to determine if the first sensor is in a first logic state or a second logic state. In various examples, the processing resource will execute determine instructions 551 to obtain information related to the logic state of the first sensor. Detecting the logic state allows the first sensor to determine the level of print media in the tray. Once the first sensor determines the level of print media in the tray, the processing resource causes the imaging system to send a notification to the user to inform the user of the level of print media in the tray. If the first logic state of the first sensor is a logic state of 0 (e.g., print media above a threshold level), the imaging system may inform the user that the print media is above the threshold level or the imaging system may not inform the user of the level of print media in the tray since there is no cause for concern. In contrast, if the second logic state of the first sensor is a logic state of 1 (e.g., print media at or below a threshold level), the imaging system will inform the user that the print media has reached or is below a threshold.

The non-transitory machine-readable medium 550 stores instructions 552 executable by a processing resource to detect a first printing event. In some examples, the processing resource will execute detect instructions 552 to determine when the first sensor should be locked in a particular logic state. When a first printing event is detected the processing resource can cause the first sensor to refrain from transitioning between logic states and remain in the logic state immediately following the first printing event. In some examples, a first printing event is an event that prevents the print media in the tray from being above a threshold level and/or blocks/limits the flow of print media from the tray through the print media pathway. For example, if the first printing event is print media reaching or dropping below a threshold level, it is not possible for print media in the tray to be above a threshold level. In this example, the first sensor will transition to a logic state of 1 (e.g., a second logic state) and remain in the logic state of 1 until the first sensor is reset. If the first printing event is a print media jam and the first sensor is in a logic state of 0 (e.g., a first logic state), the first sensor will remain in the current logic state until the first sensor is reset.

In some examples, preventing the first sensor from transitioning between logic states can prevent inaccurate notification to the user relating to the level of print media in the tray. In addition, it can prolong the life of the first sensor and thereby increasing the life of the imaging system, as compared to imaging systems that do not lock the print media sensor after a first printing event. In some examples, if the first sensor is locked in a logic state and it is not possible for the first sensor to transition to another logic state without resetting the first sensor (e.g., second printing event), even if the first sensor determines that a transition in logic state is warranted, the first sensor will not transition to another logic state. As such, the first sensor is prevented from giving erroneous readings even if the first sensor has a defect.

The non-transitory machine-readable medium 550 stores instructions 553 executable by a processing resource to refrain from transitioning the first sensor between a first logic state and a second logic state. In some examples, the processing resource will execute lock instructions 553 to force the first sensor in a particular logic state. After a first printing event, the processing resource will lock the first sensor in the current logic state to prevent the first sensor from erroneously switching logic states. As such, the imaging system will refrain from providing an updated notification regarding the level of print media in the tray. That is, the imaging system may provide the user with a notification related to the previously detection of print media but will not provide a notification related to the detection of print media that occurred subsequent to the locking of the first sensor.

The non-transitory machine-readable medium 550 stores instructions 554 executable by a processing resource to detect a second printing event from a second sensor. In some examples, the processing resource will execute detect instructions 554 to determine when the first sensor should unlock and transition between logic states based on the level of print media in the tray. The second printing event will be related to the first printing event. The second printing event can be detected by a sensor that is different from the first sensor. For example, when a second sensor (e.g., tray sensor, pathway sensor, power sensor, etc.) detects a second printing event related to the first printing event, the processing resource causes the first sensor to unlock. When the first sensor is unlocked the first sensor causes the imaging system to send notifications to a user related to the level of print media in the tray. Non-limiting examples of second printing events can include removing and replacing the tray of the imaging system, activating the imaging system from a deactivated state, restarting the imaging system, and removing a print media jam from the imaging system.

The non-transitory machine-readable medium 550 stores instructions 555 executable by a processing resource to transition the first sensor between a first logic state and a second logic state. In some examples, the processing resource will execute unlock instructions 555 to allow the first sensor to transition between the first logic state and the second logic state, After the processing resource unlocks the first sensor, the first sensor can transition between a first logic state and a second logic state based on the level of print media in the tray. In addition, after detecting a second printing event causing the first sensor to unlock, the imaging system can send an updated notification to the user based on the current logic state of the first sensor.

The figures herein follow a numbering convention in which the first digit corresponds to the drawing figure number and the remaining digits identify an element or component in the drawing. Similar elements or components between different figures can be identified by the use of similar digits. For example, 102 can reference element "02" in FIG. 1, and a similar element can be referenced as 302 in FIG. 3.

Elements shown in the various figures herein can be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

The above specification and examples provide a description of the method and applications and use of the system and method of the present disclosure. Since many examples can be made without departing from the scope of the system and method, this specification merely sets forth some of the many possible example configurations and implementations.

It should be understood that the descriptions of various examples may not be drawn to scale and thus, the descriptions can have a different size and/or configuration other than as shown therein,

What is claimed:

1. A method comprising:

activating a dynamic state for a first sensor responsive to an activation of an imaging system, wherein the dynamic state allows the first sensor to transition between logic states;

determining if the first sensor is in a first logic state or a second logic state based on a level of print media in a tray responsive to the activation of the imaging system;

detecting a first printing event indicating a limit on a flow of print media out of the tray;

locking the first sensor in a current logic state subsequent to the detection of the first printing event, wherein the current logic state is the logic state of the first sensor subsequent to the detection of the first printing event; and removing the lock, related to the first printing event, on the first sensor responsive to detecting a second printing event by a second sensor.

2. The method of claim 1, further comprising determining if the first sensor is in the first logic state or the second logic state based on the level of print media in the tray responsive to removal of the lock on the first sensor.

3. The method of claim 1, further comprising:

detecting an additional first printing event from a third sensor;

locking the first sensor in the current logic state subsequent to the detection of the additional first printing event; and removing the lock, related to the additional first printing event, on the first sensor responsive to detecting an additional second printing event related to the additional first printing event, wherein removing the lock places the first sensor in the dynamic state.

4. The method of claim 3, further comprising detecting the additional second printing event by the second sensor or the third sensor.

5. The method of claim 3, further comprising determining if the first sensor is in the first logic state or the second logic state based on the level of print media in the tray responsive to removing the lock, related to the first printing event and the additional first printing event, on the first sensor.

6. The method of claim 5, further comprising detecting the first printing event and the additional first printing event at a substantially same time.

* * * * *